US010865836B2

(12) United States Patent
Lorenz et al.

(10) Patent No.: US 10,865,836 B2
(45) Date of Patent: Dec. 15, 2020

(54) CLUTCH DEVICE FOR A HYBRID DRIVE SYSTEM

(71) Applicant: SCHAEFFLER TECHNOLOGIES AG & CO. KG, Herzogenaurach (DE)

(72) Inventors: Elmar Lorenz, Rheinmuenster Soellingen (DE); Thomas Ossadnik, Birkenwerder (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 125 days.

(21) Appl. No.: 15/753,754

(22) PCT Filed: Aug. 19, 2016

(86) PCT No.: PCT/DE2016/200386
§ 371 (c)(1),
(2) Date: Feb. 20, 2018

(87) PCT Pub. No.: WO2017/028862
PCT Pub. Date: Feb. 23, 2017

(65) Prior Publication Data
US 2018/0283469 A1 Oct. 4, 2018

(30) Foreign Application Priority Data

Aug. 20, 2015 (DE) .......................... 10 2015 215 895

(51) Int. Cl.
*F16D 25/0638* (2006.01)
*F16D 21/06* (2006.01)
(Continued)

(52) U.S. Cl.
CPC ............ *F16D 25/0638* (2013.01); *B60K 6/38* (2013.01); *F16D 21/06* (2013.01); *F16D 25/10* (2013.01);
(Continued)

(58) Field of Classification Search
CPC ...... F16D 25/0638; F16D 21/06; F16D 25/10; F16D 48/02; F16D 2021/0607; F16D 2021/0661; B60K 6/38
See application file for complete search history.

(56) References Cited

U.S. PATENT DOCUMENTS 5,887,690 A * 3/1999 Haupt .................... F16D 21/06
192/48.611
6,378,675 B1 4/2002 Kundermann et al.
(Continued)

FOREIGN PATENT DOCUMENTS

CN 1463865 A 12/2003
CN 101010212 A 8/2007
(Continued)

OTHER PUBLICATIONS

Chinese Office Action for Chinese Application No. 201680044552. X, dated Feb. 29, 2019, 7 pages.
(Continued)

*Primary Examiner* — Tinh Dang

(57) ABSTRACT

A clutch device that includes a first and a second input side, a first and a second output side, wherein the input sides and the output sides can be rotated about a common rotation axis. The clutch device further includes a first clutch between the first input side and the first output side, a second clutch between the first input side and the second output side, a third clutch between the first input side and the second input side, and an actuator device for the third clutch when the second input side rotates faster than the first input side.

18 Claims, 3 Drawing Sheets

(51) Int. Cl.
*F16D 25/10* (2006.01)
*B60K 6/38* (2007.10)
*F16D 48/02* (2006.01)

(52) U.S. Cl.
CPC ...... *F16D 48/02* (2013.01); *F16D 2021/0607* (2013.01); *F16D 2021/0661* (2013.01); *F16D 2048/0203* (2013.01); *F16D 2500/1026* (2013.01)

(56) References Cited

U.S. PATENT DOCUMENTS

| | | | |
|---|---|---|---|
| 7,726,430 B2 | 6/2010 | Yang | |
| 7,896,145 B2* | 3/2011 | Kato | F16D 25/0638 192/48.619 |
| 8,162,085 B2 | 4/2012 | Burchett et al. | |
| 8,281,915 B2 | 10/2012 | Kato et al. | |
| 8,297,424 B2 | 10/2012 | Bradley | |
| 8,322,503 B2 | 12/2012 | Combes et al. | |
| 8,453,817 B2* | 6/2013 | Schrage | B60K 6/26 192/48.611 |
| 8,757,305 B2* | 6/2014 | Roske | B60K 6/38 180/65.22 |
| 9,073,544 B2 | 7/2015 | Whitney et al. | |
| 9,193,255 B2 | 11/2015 | Arnold et al. | |
| 9,945,428 B2* | 4/2018 | Goleski | F16D 25/0638 |
| 10,132,404 B2* | 11/2018 | Goleski | F16H 57/08 |
| 2007/0125615 A1* | 6/2007 | Okada | F16D 25/0638 192/48.611 |
| 2010/0326785 A1* | 12/2010 | Schrage | B60K 6/26 192/70.12 |
| 2011/0259698 A1* | 10/2011 | Arnold | B60K 6/36 192/48.1 |

FOREIGN PATENT DOCUMENTS

| | | |
|---|---|---|
| CN | 101450619 A | 6/2009 |
| CN | 101761590 A | 6/2010 |
| CN | 102695891 A | 9/2012 |
| CN | 103448714 A | 12/2013 |
| DE | 102009059944 A1 | 7/2010 |
| DE | 102011009807 A1 | 11/2011 |
| DE | 112006001481 B4 | 9/2012 |
| DE | 102011080454 A1 | 2/2013 |
| GB | 2264152 A | 8/1993 |

OTHER PUBLICATIONS

International Search Report for Application No. PCT/DE2016/200386, dated Feb. 10, 2017, 7 pages.

* cited by examiner

CLUTCH DEVICE FOR A HYBRID DRIVE SYSTEM

CROSS-REFERENCE TO RELATED APPLICATIONS

This application is the U.S. National Phase of PCT/DE2016/200386 filed Aug. 19, 2016, which claims priority to DE 102015215895.0 filed Aug. 20, 2015, the entire disclosures of which are incorporated by reference herein.

TECHNICAL FIELD

The disclosure relates to a clutch device. In particular, the disclosure concerns a clutch device for a hybrid drive system.

BACKGROUND

A motor vehicle has a first drive motor which is configured as an electrical machine, and a second drive motor which is configured as an internal combustion engine. The motor vehicle drive may be hybrid, i.e. use any arbitrary combination of the first and/or second drive motors. For this, a clutch device is provided between the drive motors and a transmission of the motor vehicle.

DE 10 2009 059 944 A1 describes a clutch device for a motor vehicle with hybrid drive.

DE 10 2011 080 454 proposes providing parallel-connected separating clutches in a drive train for a motor vehicle with hybrid drive, and using an overrun device on one of the separating clutches.

SUMMARY

The disclosure is based on the object of indicating an improved clutch device which may also be used in a hybrid drive. The disclosure achieves this object by as disclosed below.

A clutch device comprises a first input side and a second input side, a first output side and a second output side, wherein the input sides and the output sides can be rotated about a common rotation axis. The clutch device furthermore comprises a first clutch between the first input side and the first output side, and a second clutch between the first input side and the second output side. In addition, a third clutch is provided between the first input side and the second input side. Furthermore, a passive actuator device for the third clutch is provided when the second input side rotates faster than the first input side.

The three clutches may be integrated compactly and easily in a common functional unit. The passive actuation of the third clutch allows automatic coupling of a drive motor connected to the second input side. A control unit and a separate actuator device for the third clutch, for example by using hydraulics, may here be omitted.

The actuator device may comprise an overrun device which transmits torque only from the second input side to the first input side. The passive actuator device may connect the second input side by torque engagement to the first input side when the rotation speed of the second input side is higher than that of the first input side, and separate them when the rotation speed of the second input side is lower than that of the first input side.

The overrun device may comprise a leaf spring element which is inclined relative to the rotational plane about the rotation axis, and the axial ends of which are in contact with the first input side or the second input side. The leaf spring element may act as an overrun device, and furthermore exert an axial actuating force on the third clutch when the overrun device closes, i.e. creates a torque engagement between the second and the first input sides. The leaf spring element may comprise one or more leaf springs which extend tangentially to a periphery around the rotation axis or helically on the periphery. A friction engagement to the respective input side may be provided on both axial sides; the leaf spring element may also be attached by torque engagement on one axial side.

In one embodiment, the first input side is configured to receive an axial actuating force from the first, second and/or third clutch. The first input side can here advantageously fulfil several functions. In particular, the first input side may be constructed as a pot with a radial and an axial portion, wherein the radial portion may be formed suitably to receive an axial actuating force for example.

The actuator device may be arranged radially inside the third clutch. This structure can save space and advantageously offers short paths for force transmission to the actuator device.

In a preferred embodiment, the first and second clutch may be offset radially. The first and second clutch may be configured to be actuated from the same axial side. For example, the first clutch may lie radially outside the second clutch, and the respective drive input sides of the clutches may lie radially on the outside and the output sides radially on the inside. A substantially S- or Z-shaped connecting element may be provided to connect the side lying opposite the actuation side of the second clutch to the radially outer drive side of the first clutch, which may simultaneously form the first input side. An actuation of the first clutch may pass through an axial recess in the connecting element.

The first input side may be held relative to the rotation axis by using a radially inwardly extending holding element. The holding element may also be connected to the input side or the radially outer drive side of the first clutch. Advantageously, the torque transmitted by the clutch device does not flow through the holding element. The holding element and the connecting element described above may be connected to the first input side on the same side, for which a single combined connection may suffice, for example a form fit or material fit connection.

All three clutches may be arranged in a common housing which is partially filled with a liquid medium. The liquid medium, in particular an oil, may serve for cooling, cleaning and lubrication of clutch components.

It is furthermore preferred that hydraulic actuator devices are provided for actuating the clutches. At least one of the clutches is preferably actuated hydraulically. The first and second clutches are preferably actuated by the same principle, in particular both hydraulically. The third clutch is also preferably actuated hydraulically. An actuating fluid of a hydraulic actuator device may comprise the liquid medium with which the housing is at least partially filled.

The first input side may be configured for connection to a rotor of an electrical machine. In particular, the rotor may be radially outwardly surrounded by a stator of the electrical machine. This allows a compact drive unit which integrates both the clutch device and the electrical machine.

Also, the second input side may be configured for connection to an output shaft of an internal combustion engine.

According to a further aspect, a clutch device comprises a first input side and a second input side, a first output side and a second output side, wherein the input sides and the output sides can be rotated about a common rotation axis.

The clutch device furthermore comprises a first clutch between the first input side and the first output side, and a second clutch between the first input side and the second output side. In addition, a third clutch is provided between the first input side and the second input side. The first input side is configured to form an axial contact for friction linings of the first clutch and for friction linings of the third clutch.

The clutch device can thus be improved to be axially compact and produced using a reduced number of components, so that production costs can be lowered.

According to a further aspect, a clutch device comprises a first input side and a second input side, a first output side and a second output side, wherein the input sides and the output sides can be rotated about a common rotation axis. The clutch device furthermore comprises a first clutch between the first input side and the first output side, and a second clutch between the first input side and the second output side. The first input side is radially supported by using a holding element, and a connecting element with torque engagement is provided between the first input side and the second clutch. The holding element and the connecting element here lie axially on each other in the region of the first input side.

The connections between the first input side and the holding element on one side and the connecting element on the other may be configured jointly, so that a simple, installation-friendly connection can be achieved.

In a preferred embodiment, the holding element and the connecting element may be held axially on the first input side by using a common locking element.

BRIEF DESCRIPTION OF THE DRAWINGS

The disclosure is now explained in more detail below with reference to the attached figures, in which.

DETAILED DESCRIPTION

Figure 1:
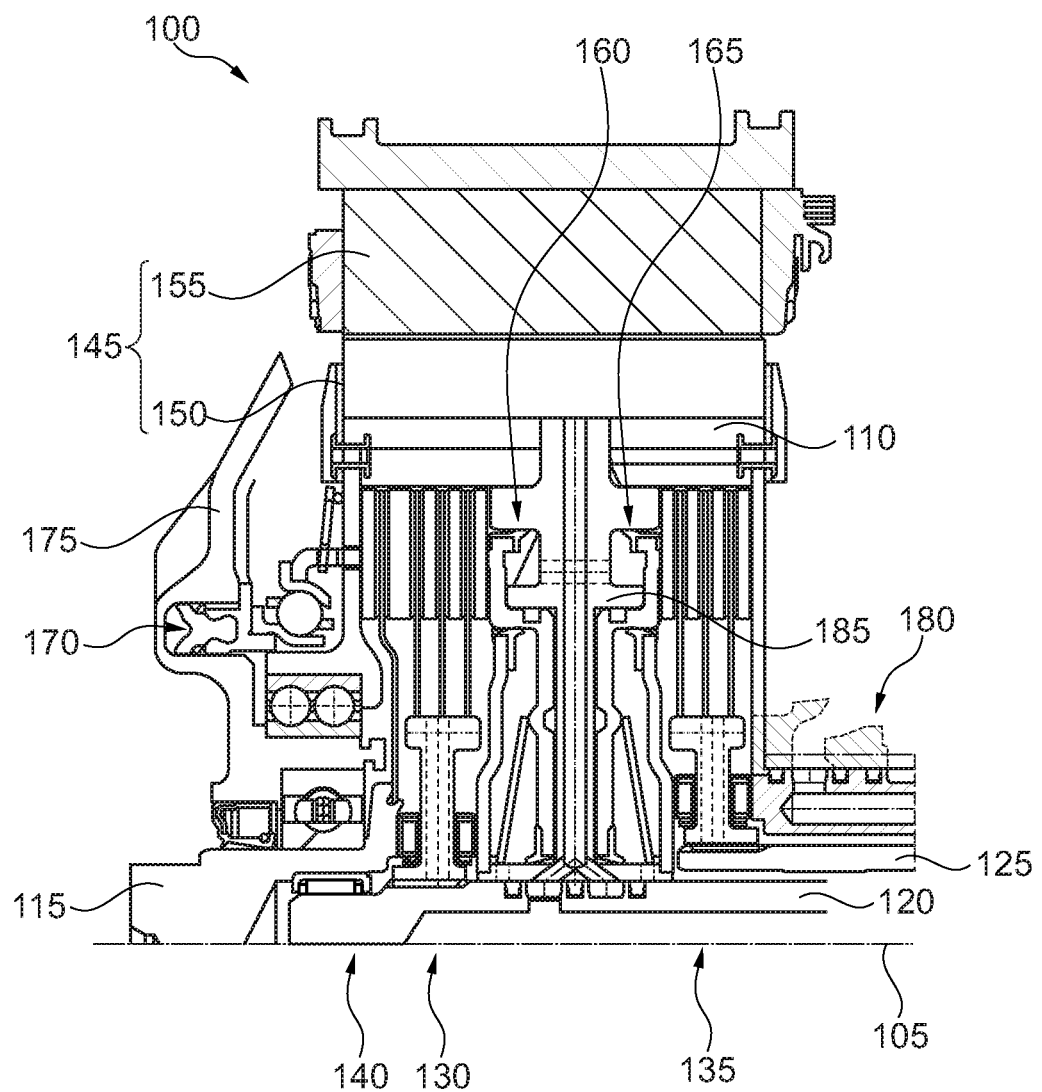
FIG. 1 shows an exemplary clutch device.

FIG. 1 shows an exemplary clutch device 100. A first input side 110, a second input side 115, a first output side 120 and a second output side 125 are arranged around a rotation axis 105.

A first clutch 130 lies between the first input side 110 and the first output side 120, a second clutch 135 lies between the first input side 110 and the second output side 125, and an optional third clutch 140 lies between the first input side 110 and the second input side 115. The first two clutches 130 and 135 are offset radially or preferably axially to each other and form an axial double clutch. The third clutch 140 is preferably offset axially to at least one of the two other clutches 130 and 135.

The first input side 110 is configured for connection to an electrical machine 145 which in general comprises a rotor 150 and a stator 155. The electrical machine 145 may be an internal rotor type, wherein the rotor 150 lies radially inside the stator 155. It is further preferred that the stator 155 comprises at least one magnetic coil, and the rotor 150 comprises at least one permanent magnet. The rotor 150 preferably lies radially outside the clutches 130, 135 and 140, and in the embodiment shown is connected to the first input side 110 by means of riveting. The second input side 115 is preferably configured for connection to a combustion machine, in particular an internal combustion engine, further preferably a reciprocating piston engine.

The output sides 120 and 125 are configured for connection to input shafts of a double gearbox (not shown). The double gearbox is normally configured to couple each of the input shafts to a common output shaft by means of a separate gearwheel pair. If the drive train is arranged in a motor vehicle, the output shaft may finally act on a drive wheel of the motor vehicle. In order to select a gear, usually one of the clutches 130, 135 is closed while the respective other clutch 130, 135 is opened. The double gearbox may include several gearwheel pairs on each gearbox shaft, each pair forming a gear stage. A gearwheel pair may usually be engaged or disengaged when it is connected to an output shaft 120, 125, the assigned clutch 130, 135 of which is already opened.

The clutch device 100 in particular is configured to be used in the drive train of a motor vehicle. The motor vehicle may preferably have hybrid drive, i.e. be driven either by the internal combustion engine, or by the electrical machine 145, or alternatively by both drive motors. If the internal combustion engine is used, the third clutch 140 is closed. If the electrical machine 145 is used, it is normally actuated electrically such that torque can be transferred. The two drive motors may apply both positive and negative torque to the drive train. The electrical machine 145 may also receive kinetic energy from the drive train and convert this into electrical energy, which for example may be temporarily stored in an energy accumulator. Because of its compact structure, the clutch device 100 is particularly suitable for installation transversely at the front of the motor vehicle.

A first actuator device 160 is assigned to the first clutch 130, a second actuator device 165 to the second clutch 135, and a third actuator device 170 to the third clutch 140. All three actuator devices 160, 165 and 170 may be hydraulic and may each be configured to exert an axial force on one of the clutches 130, 135, 140, so that friction elements of the clutches 130, 135 or 140 are pressed axially against each other in order to generate a friction engagement and transmit a torque between the friction elements. The friction elements may be each pressed together between the assigned actuator device 160, 165, 170 and an axial thrust bearing. Furthermore, it is preferred that the hydraulic actuator devices 160, 165, 170 can be actively controlled individually in that, by use of e.g. a valve or pump, pressurized pressure medium is deliberately introduced into or discharged from a hydraulic pressure chamber of the respective actuator device 160, 165, 170. Alternatively for example, a centrifugal oil-controlled actuation may be provided.

The three clutches 130, 135 and 140 are preferably arranged in a common housing 175 which may be at least partially filled with a liquid medium 180, in particular an oil. The medium 180 may also be used as a working medium (hydraulic fluid) for one of the actuator devices 160, 165 and 170. The clutches 130, 135 and 140 are preferably each of the wet-running type and may be designed independently of each other as single plate or multiplate clutches. Further preferably, the first clutch 130 and the second clutch 135 are of the multiplate type, in order to allow finely-controlled opening and closing of the torque flow through the clutches 130, 135. The third clutch 140 may also, as shown, be of the single plate type, wherein the third clutch 140 may be configured as a shift clutch which as far as possible is not operated under slip.

In the embodiment shown, a radial flange 185 is arranged axially between the first clutch 130 and the second clutch 135 as a thrust bearing, against which the clutches 130, 135 may be pressed by means of the assigned actuator device 160, 165. Axial forces of the actuator devices 160, 165, 170 are preferably supported inside the clutch device 100, so that no resulting forces need be supported externally.

If the clutch device 100 is used in a drive train without the electrical machine 145, the third clutch 140 may also be omitted. The first input side 110 and the second input side 115 then coincide.

Figure 2:
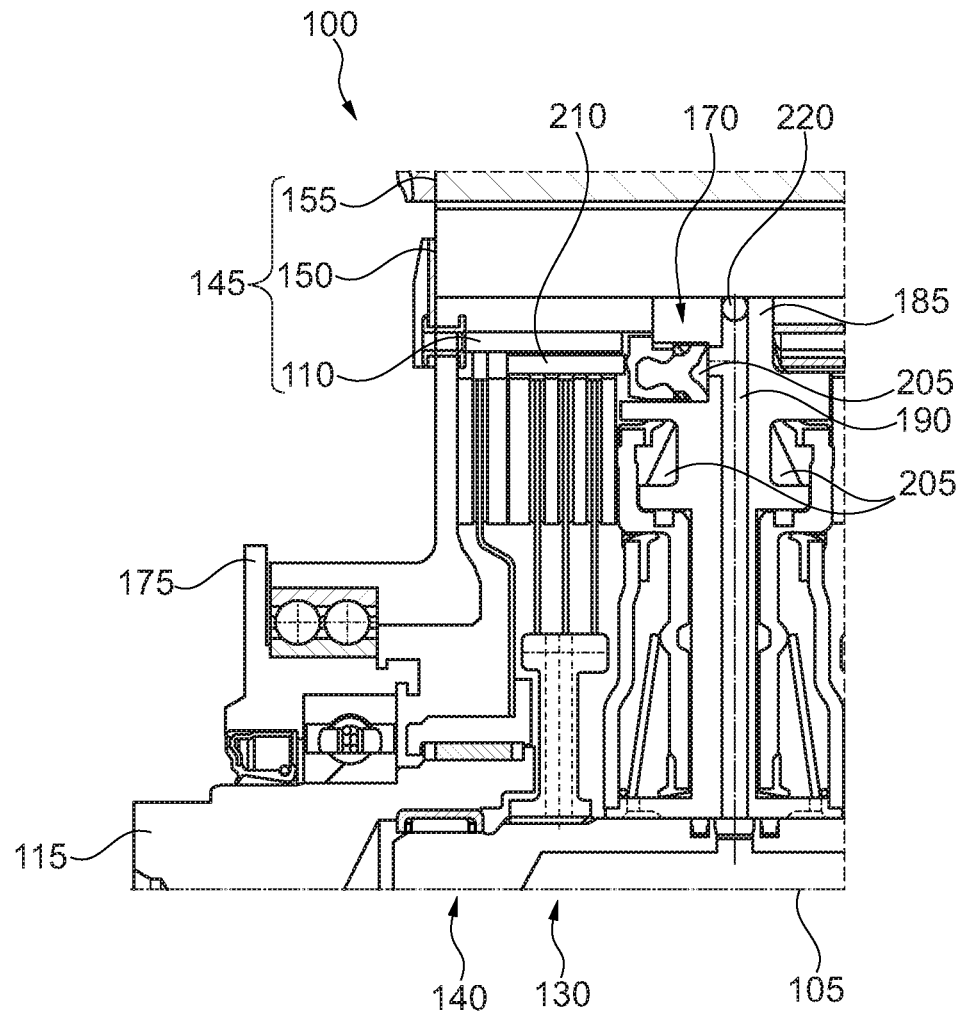
FIG. 2 shows a further embodiment of the clutch device of FIG. 1.

FIG. 2 shows a further embodiment of the clutch device 100 of FIG. 1. The embodiment shown here differs from that of FIG. 1 mainly in that the third actuator device 170 is arranged in the region of the flange 185. The three actuator devices 160, 165 and 170 may be designed to integrate with the flange 185, in that the flange 185 provides axial depressions which delimit hydraulic working chambers 205 of the actuator devices 160, 165 and 170, and which are closed by using the assigned hydraulic piston. An actuator element 210 runs between the third actuator device 170 and the third clutch 140, here on the radial outside of the first clutch 130 in the axial direction.

In the embodiment shown, the supply 190 is closed on the radial outside by using a closing body 220, here configured as a ball. The closing body 220 may be secured by the rotor 150 of the electrical machine 145 lying radially against it on the outside.

Figure 3:
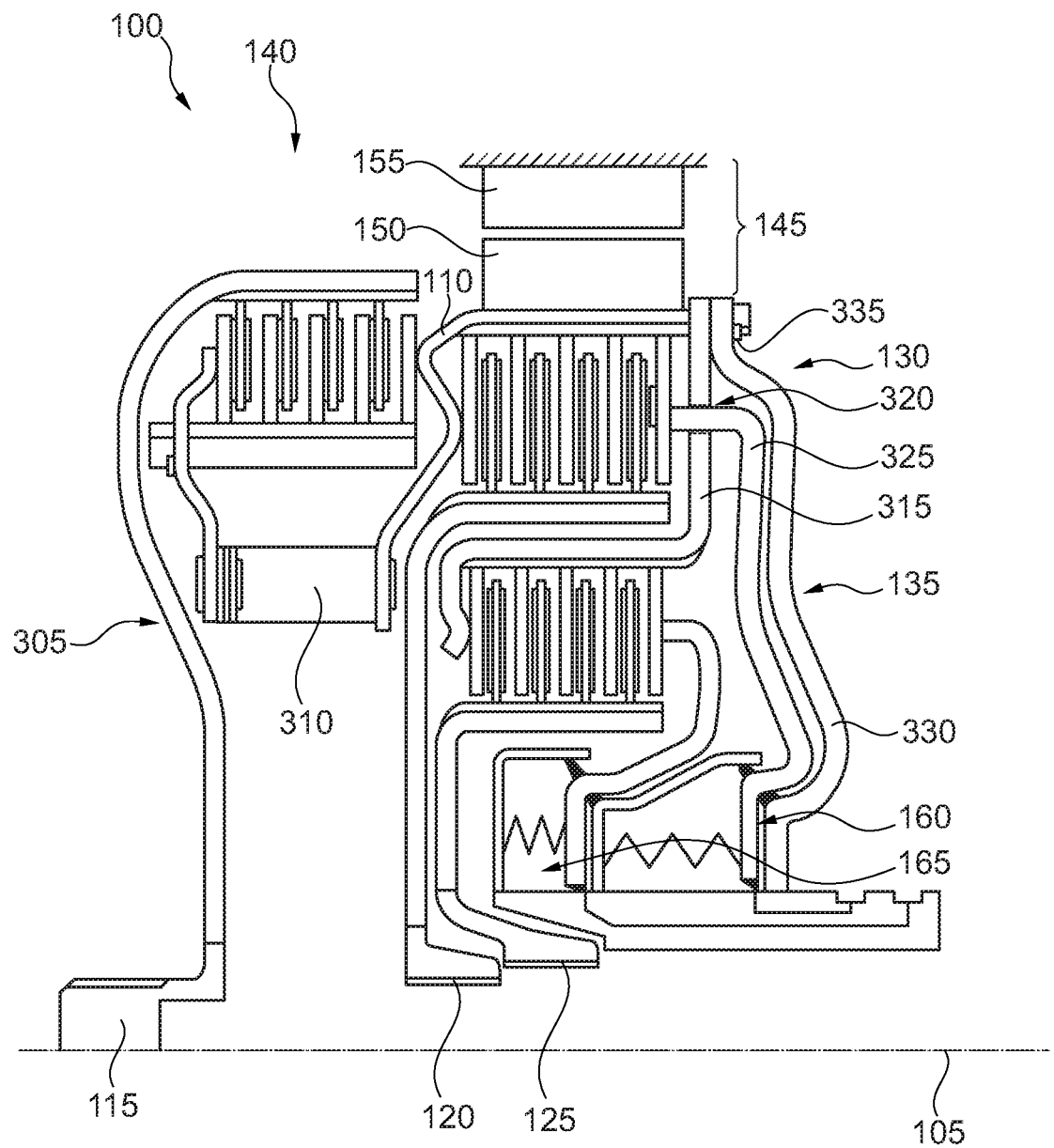
FIG. 3 shows a clutch device according to FIGS. 1 and 2 with a passive actuator device.

FIG. 3 shows a clutch device 100 according to FIG. 1 or 2 with a passive actuator device 305 which is configured to actuate the third clutch 140, and hence allow a torque flow between the second input side 115 and the first input side 110 when the rotation speed of the second input side 115 is higher than that of the first input side 110. The actuation may be achieved by axial compression of friction elements of the third clutch 140. The passive actuator device 305 is controlled by rotation speed and requires no active control, for example in the form of a mechanical adjustment or a hydraulic pressure.

The passive actuator device 305 is preferably designed as an overrun device which allows a torque transmission exclusively from the second input side 115 to the first input side 110 but not in the opposite direction. The third clutch 140 comprises for example a drive input side lying radially outside and an output side lying radially inside, wherein also as an example the actuator device 305 is arranged radially inside the third clutch 140; an arrangement radially outside or axially offset to the clutch 140 or its friction linings is also possible.

In the particularly preferred embodiment shown, the overrun device comprises a leaf spring 310 which encloses an acute angle with the rotational plane around the rotation axis 105. The leaf spring element may extend tangentially to a periphery around the rotation axis 105 or helically on the periphery. A first axial end of the leaf spring 310 is connected by friction engagement or fixedly to the first input side 110. For this, the first input side 110 may, as shown, extend radially inward up to the leaf spring 310. The first input side 110 may also serve as an axial contact element for the third clutch 140. The opposing second axial end is connected to an output side of the third clutch 140, wherein once again a friction engagement or fixed engagement is possible, with the restriction that a friction engagement must be present on at least one axial end. In the explanation below, it is assumed as an example that a frictional engagement is present between the leaf spring 315 and the third clutch 140.

If the third clutch 140 is not actuated i.e. not compressed axially, so that it transmits substantially no torque between the second input side 115 and the first input side 110, usually however it still transmits a degree of slip moment which may be caused in particular by the liquid medium 180 between friction elements of the third clutch 140. Therefore a relative movement exists between the leaf spring 310 and the output side of the third clutch 140 when the input rotation speed of the third clutch 140 is different from its output rotation speed. The relative movement twists the leaf spring 310 about the rotation axis 105, whereby it tries to change its axial length. On a twist in the one direction, the leaf spring 310 therefore exerts an axial spreading force, whereas on twisting in the other direction, it is instead axially compressed. The spreading force is used to compress the third clutch 140 axially and hence actuate or close it.

In the present embodiment, the first clutch 130 and the second clutch 135 are arranged radially offset, although an axially offset arrangement, as in the embodiments of FIG. 1 or 2, may also be used. As an example, the first clutch 130 lies radially on the outside and the second clutch 135 radially on the inside. The drive input sides of the clutches 130, 135 each lie on the radial outsides of their assigned friction elements, and their output sides correspondingly lie radially on the inside. The output sides are connected by torque engagement to the output sides 120 or 125 of the clutch device 100 via radial elements.

Irrespective of whether the leaf spring 310 is used or not, the first input side 110 is preferably configured to serve as an axial contact surface for the friction elements of the first clutch 130 and/or the third clutch 140. For this, the first input side 110 may be configured, as shown, as a pot with an axial and radial portion. The axial portion preferably engages by form fit in friction elements of the first clutch 130, and the radial portion—which adjoins the axial portion axially on one side and preferably integrally—extends for example as shown in an S-shape, initially to the friction elements of the first clutch 140, and then further radially inward and axially to the friction elements of the first clutch 130, and optionally from there further radially inward and axially in the direction of the leaf spring 310. The axial contact surfaces of the first input side 110 may give the radial portion a concentric wave form around the rotation axis 105.

The two clutches 130, 135 may be actuated from the same axial side, wherein this side further preferably lies opposite the side which axially faces the third clutch 140. In the depiction of FIG. 3, the two clutches 130, 135 are actuated from the right. Corresponding hydraulic actuator devices 160 and 165 are shown in one possible respective embodiment; other embodiments are however also possible.

The drive side of the second clutch 135 may be connected to the first input side 110 of the clutch device 100 by torque engagement by using connecting element 315, which extends in an S- or Z-shape initially radially outwardly from the left side of the second clutch 135, then axially to the right in a radial region between the first clutch 130 and the second clutch 135, and then to the right, past the right side of the first clutch 130, radially outwardly up to the first input side 110. Here, a recess 320 is provided in the connecting element 315 to allow an actuator element 325 to pass through axially, which can act axially on the friction elements of the first clutch 130 in order to actuate or axially compress and hence close the first clutch 130.

The connecting element 315 is preferably connected by torque engagement to the first input side 110 by form fit, for example via toothing or an engagement portion. The first input side 110 is radially supported on the same axial side by using the holding element 330. In the present embodiment, the holding element 330 extends radially inwardly up to a shaft or pin, which is here provided for example to conduct oil to the first actuator device 160. In another embodiment, the support may be provided by a shaft which can be connected to one of the output sides 120, 125 of the clutch device 100. The holding element 330 may also be configured to transmit a torque in the radial direction.

The holding element 330 may lie axially further out than the connecting element 315 in the region of the first input side 110. The holding element 330 and the connecting element 315 may be connected to the first input side 110 by torque engagement by means of the same, a uniform or an integral connection, wherein a form fit connection may be preferred. This connection may be used on a radial double clutch independently of the use of a leaf spring 310 and also independently of whether or not the third clutch 140 is used. In the embodiment shown, the holding element 330 and the connecting element 315 are held axially against the first input side 110 by using a common locking element 335. In other embodiments, a different axial locking device may be used, for example a bayonet closure, a locking pin or a rivet, or by mastic or bending.

LIST OF REFERENCE DESIGNATIONS

100 Clutch device
105 Rotation axis
110 First input side
115 Second input side
120 First output side
125 Second output side
130 First clutch
135 Second clutch
140 Third clutch
145 Electrical machine
150 Rotor
155 Stator
160 First actuator device
165 Second actuator device
170 Third actuator device
175 Housing
180 Liquid medium
185 Flange
190 Supply
205 Hydraulic working chamber
210 Actuator element
305 Actuator device
310 Leaf spring
315 Connecting element
320 Recess
325 Actuator element
330 Holding element
335 Locking element

The invention claimed is:

1. A clutch device, comprising:
a first and a second input member;
a first and a second output member, wherein the input members and the output members can be rotated about a common rotation axis;
a first clutch disposed between the first input member and the first output member;
a second clutch disposed between the first input member and the second output member;
a third clutch disposed between the first input member and the second input member; and
an actuator device for the third clutch when the second input member rotates faster than the first input member, wherein the actuator device includes a first axial end directly connected to the first input member and an opposing second axial end directly connected to a third clutch output member.

2. The clutch device of claim 1, wherein the actuator device comprises a passive actuator device configured to transmit torque only from the second input member to the first input member, but not an opposite direction.

3. The clutch device of claim 2, wherein the passive actuator device comprises a leaf spring element that is inclined relative to a rotational plane about the common rotation axis, and axial ends of the leaf spring element are in contact with the first input member or the second input member.

4. The clutch device of claim 1, wherein the first input member is configured to receive an axial actuating force from the first, second, or third clutch.

5. The clutch device of claim 1, wherein the actuator device is arranged radially inside the third clutch.

6. The clutch device of claim 1, wherein the first and second clutches are radially offset and configured to be actuated from the same axial side.

7. The clutch device of claim 1, wherein the first input member is held relative to the common rotation axis by using a radially inwardly extended holding element.

8. The clutch device of claim 1, wherein the first, second, and third clutches are arranged in a common housing which is partially filled with a liquid medium.

9. The clutch device of claim 1, wherein the first input member is configured for connection to a rotor of an electrical machine.

10. The clutch device of claim 9, wherein the rotor is surrounded radially outwardly by a stator of the electrical machine.

11. The clutch device of claim 1, wherein the second input member is configured for connection to an output shaft of an internal combustion engine.

12. The clutch device of claim 11, wherein the third clutch is disposed between the first input member and the second input member and an actuator device for the third clutch is provided when the second input member rotates faster than the first input member.

13. The clutch device of claim 12, wherein the actuator device includes a passive actuator device configured to transmit torque from the second input member to the first input member, but not an opposite direction.

14. The clutch device of claim 13, wherein the passive actuator device includes a leaf spring element configured to exert an axial actuating force on the third clutch when the overrun device transmits torque between the second and the first input members.

15. A clutch device comprising:
a first and a second input member;
a first and a second output member;
wherein the input members and the output members can be rotated about a common rotation axis;
a first clutch disposed between the first input member and the first output member;
a second clutch disposed between the first input member and the second output member; and
a third clutch disposed between the first input member and the second input member;
wherein the first input member is configured to form an axial contact for friction linings of the first clutch and for friction linings of the third clutch; and
a leaf spring of the third clutch, wherein the leaf spring includes a first axial end directly connected to the first input member and an opposing second axial end directly connected to a third clutch output member.

16. The clutch device of claim 15, wherein the leaf spring extends tangentially to a periphery around the rotation axis or helically on the periphery.

17. The clutch device of claim 15, wherein the first axial end of the leaf spring is connected by friction engagement or fixedly to the first input member.

18. The clutch device of claim 15, wherein the leaf spring is radially towards the rotation axis with the respect to the third clutch.

\* \* \* \* \*